United States Patent
Potonniee

Patent Number: 5,983,233
Date of Patent: Nov. 9, 1999

[54] PROCESS FOR MANAGING THE NAMING OF OBJECTS, PROCESS FOR MAPPING AN OBJECT NAME TO A CORBA OBJECT REFERENCE, PROGRAM MODULE, COMPUTER UNIT, AND COMPUTER SYSTEM

[75] Inventor: Olivier Potonniee, Paris, France

[73] Assignee: Alcatel Alsthom Compagnie Generale d'Electricite, Paris, France

[21] Appl. No.: 08/912,297

[22] Filed: Aug. 15, 1997

[30] Foreign Application Priority Data

Aug. 20, 1996 [EP] European Pat. Off. ............ 96 440 062

[51] Int. Cl.$^6$ .................................................. G06F 17/00
[52] U.S. Cl. .......................... 707/103; 395/682; 395/683; 395/685
[58] Field of Search ................. 707/1–206; 395/680–685

[56] References Cited

U.S. PATENT DOCUMENTS

| | | | |
|---|---|---|---|
| 5,724,503 | 3/1998 | Kleinman et al. | 395/683 |
| 5,794,038 | 8/1998 | Stutz et al. | 395/683 |
| 5,835,914 | 11/1998 | Brim | 707/3 |

OTHER PUBLICATIONS

"Hierarchical Object Groups in Distributed Operating Systems" in Institute of Electrical and Electronics Engineers, pp. 18–24, Jun. 13, 1988 by Kentaro Shimizu et al.

"COSS:The Common Object Services Specifications" by Martin. from Sigmod Record, Bd. 23, Nr. 2, June. 1994.

"Use of XA–Compliant to Interoprate with Object Transaction Service" in IBM Technical Disclosure Bulletin, Bd. 38, Nr. 3, Mar. 1, 1995, pp. 617–619.

"Management Framework for Open Systems Interconnection (OSI) for CCITT Applications" ITU–T Recommendation X.700, 1992.

*Primary Examiner*—Wayne Amsbury
*Assistant Examiner*—David Yiuk Jung
*Attorney, Agent, or Firm*—Ware, Fressola, Van Der Sluys & Adolphson LLP; Milton Oliver

[57] ABSTRACT

In an object environment, among the plurality of objects interact, one or several objects in the number of objects are allocated to a component. The naming management is distributed over the components. Each component manages the naming of the component or components which immediately follows it.

12 Claims, 4 Drawing Sheets

PROCESS FOR MANAGING THE NAMING OF OBJECTS, PROCESS FOR MAPPING AN OBJECT NAME TO A CORBA OBJECT REFERENCE, PROGRAM MODULE, COMPUTER UNIT, AND COMPUTER SYSTEM

TECHNICAL FIELD

The invention is directed to a procedure to manage the naming of objects in an object environment, in which a number of objects interact over CORBA mechanisms. It is also directed to a procedure for mapping a logical address of an object on a physical CORBA address of an object; a program module with a CORBA interface for interaction as a CORBA object over CORBA mechanisms; a computer for generating a CORBA interface; and a computer system with a number of objects which interact over CORBA mechanisms.

BACKGROUND OF THE INVENTION

To implement the software of distributed computer systems, object oriented design is increasingly used as the architectural principle. One such computer system software architecture is the CORBA architecture (CORBA=Common Object Request Broker Architecture), which is an important component of the OSA architecture (OSA=Object Service Architecture) specified by the Object Management Group (OMG).

The invention is based on the way that the naming management of objects (managed objects) is normally executed in a computer system according to the CORBA architecture. This is described, for example, in "Common Object Request Broker: Architecture and Specification r2.0", Object Management Group, Framingham, Mass., 1995.

A central CORBA service (naming service) is responsible for the naming management which produces this service in a central node (naming server). Here, the naming management includes, in particular, the display of a logical address of an object on a physical CORBA address (object reference). This mapping function is of vital significance for a CORBA system, as objects which act on a CORBA infrastructure can only be found by means of this physical address.

Problems arise when objects which are not specified as CORBA objects have to interact on the CORBA infrastructure over CORBA mechanisms. Dependent upon how such objects are implemented in the CORBA architecture, independent naming areas result, which cannot be accessed in a uniform way. The central naming management cannot manage these areas and access to objects in this naming area is almost impossible using CORBA mechanisms.

SUMMARY OF THE INVENTION

The invention is directed to the task of developing a more flexible naming management.

The invention is based on the idea that the naming management is no longer executed centrally but is distributed over components. Each component consists of one or more objects and is responsible for the naming management of the components which immediately follow it. These distributed elements in the naming management work together here by means of a recursive algorithm and work together to map a logical address of an object on its physical CORBA address (object reference) according to this recursive algorithm. Due to the distributed nature of the naming management, it is possible to simply combine special naming managements for independent naming areas in the CORBA naming management.

An additional advantage is that the transparency of the implementation remains guaranteed. In addition, different naming areas are integrated in a single naming scheme. A different naming management is made possible in a distributed environment.

Additional advantages result if in all part naming managements there is one uniform CORBA interface access to the naming management for all components. Thus a uniform interface (API=application interface) for the naming management is available to all applications no matter in which naming area the objects are located.

BRIEF DESCRIPTION OF THE DRAWINGS

In the following, the invention will be described using an implementation example with the help of the attached drawings.

BEST MODE FOR CARRYING OUT THE INVENTION

In the design example, the implementation of the invention procedure in the invention computer system is described, where the computer system consists of one or more invention computer units on which one or more invention program modules are running.

Figure 1A:
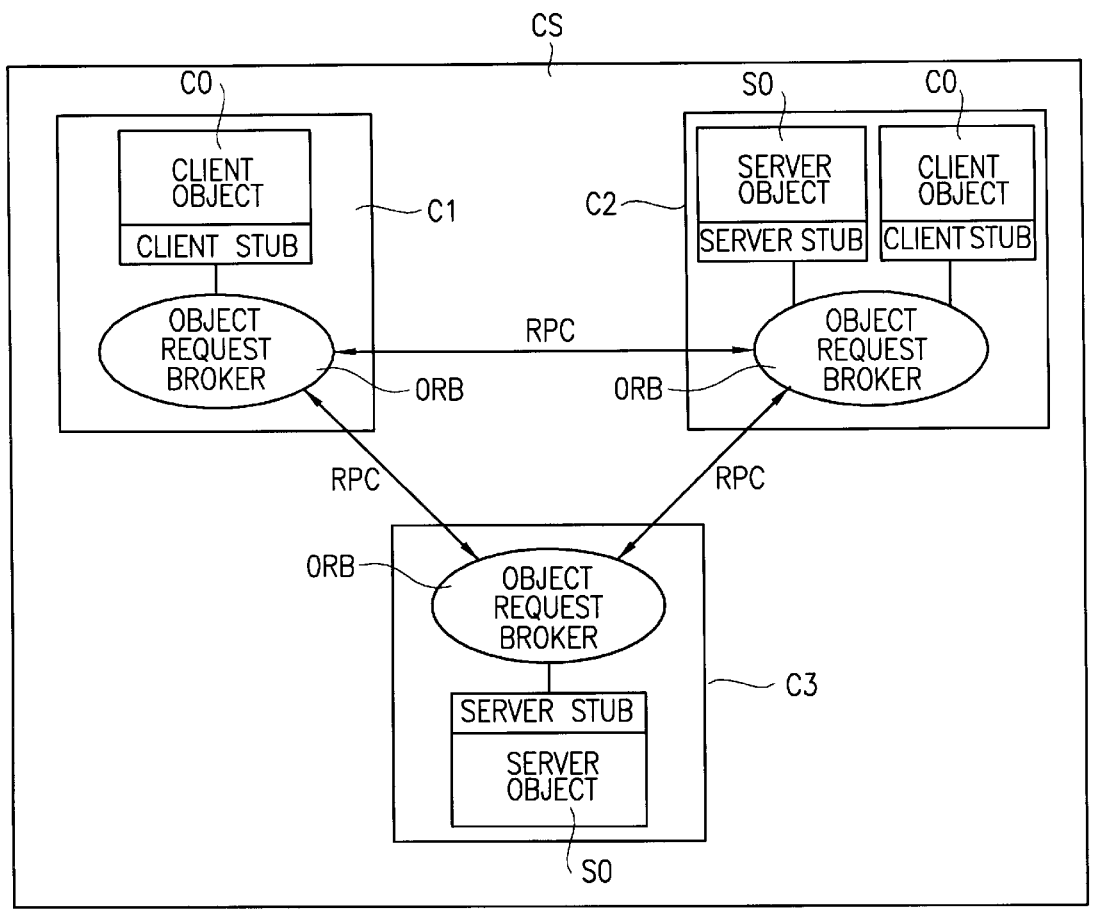
FIG. 1a shows a block diagram of a computer system as in the invention.

FIG. 1a shows a computer system CS with three computer units C1 to C3 which communicate with one another.

The computer units C1 to C3 can be a computer, a printer or network elements, for example, in a communication network. They each possess a hardware platform consisting of processors, memory devices and peripheral components, a software platform which includes, for example, an operating system and a database system and applications which are formed from application program modules which are running on the software platform. The computer units C1 to C3 are conected with one another using one or more communication networks, for example using X.25, #7, Ethernet or token ring communication systems. The software platform of the computer units C1 to C3 provides the necessary data transmission services here.

The application program modules are modelled as objects (managed objects), i.e. the code and the data of an object are represented by a sum of attributes and functions which other objects can access. The alternately directed accessing and interaction of a number of such objects then produces the application functions of the CS computer system.

According to the CORBA architecture, the computer units C1 to C3 possess several CO client objects and SO server objects and several ORB object request brokers.

From the point of view of service, the CO and SO objects can be seen as one encapsulated unit which makes available one or more services which can be requested by a client. The CO objects request services (client objects) which are produced by SO objects (server objects).

To request a service, a CO transmits a request to a SO. Such a request contains the following information: an operation, a target object, any or no parameters and, as an option, a request context. After producing this service, the SO transmits an outcome back to the CO which is defined for this request.

To transmit and receive the requests and outcomes, the SO and CO objects have an interface unit IU available.

Object request brokers (ORB) make available an infrastructure which allows objects to communicate in a distributed environment. It is therefore unimportant for the CO objects, on which of the other computer units C1 to C3 a SO object is based, and from which they want to request a service, and on which special platform or in which implementation process the object is realised.

To do this, each object knows at least one object request broker and knows how to contact this local object request broker. Each object request broker knows how to contact other object request brokers and how to communicate with them. To do this, it uses remote procedure call mechanisms. An object thus transmits a request and an ORB; the transmission of the request to the target object is dealt with by the CORBA infrastructure formed by the ORB.

Figure 1B:
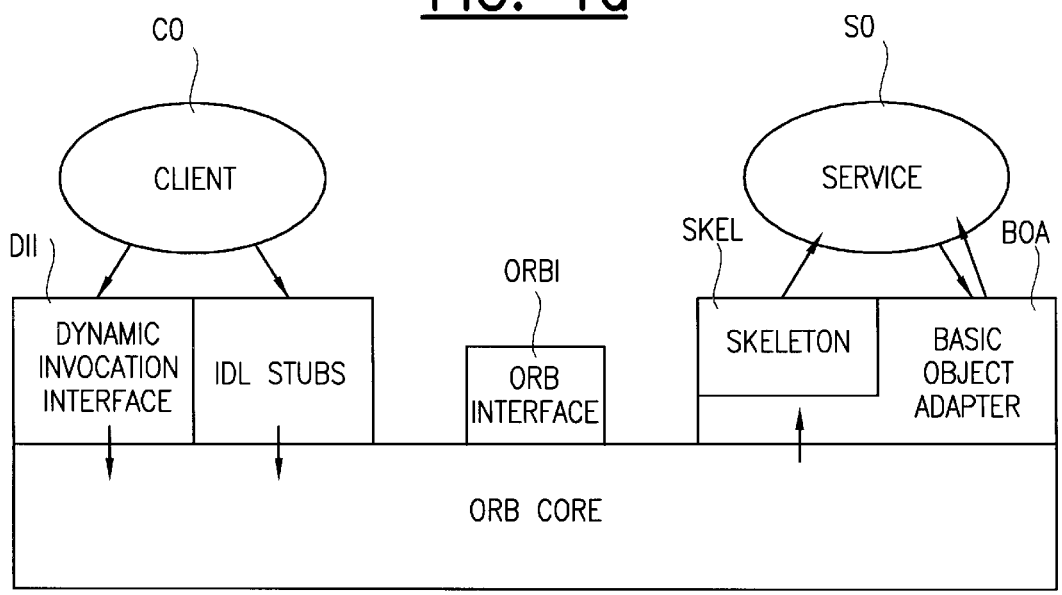
FIG. 1b shows a functional representation of the software structure of the computer system as in FIG. 1.

FIG. 1b shows a representation of the communication mechanisms for communications between a CO and a SO. FIG. 1b shows a communications layer ORB core, an overlying communications layer with five function units DII, IDLSubs, ORBI, SKEL and BOA and two objects, CO and SO, accessing these function units.

In order to be able to interact over the CORBA infrastructure by means of the CORBA mechanisms and to be able to work with other objects on this infrastructure, each of the CO and SO objects must have a CORBA specific interface. Such an interface contains a description of a block of possible operations which can request another object from this object. The interfaces of objects are defined in Interface Definition Language which is a pure interface description language. The inheritance of this interface allows one object to support several interfaces.

In CORBA, an object is directly accessed over this CORBA specific interface. The implementation of this interface is the object itself. It consists of code and data and thus does not require an agent entity as is the case if an object is represented purely by a data structure.

In order to be able to transmit a request, the CO object requires access to the object reference of the SO object, requires knowledge of the type of the SO object and the operation which is to be executed by it. The CO object initiates the request by calling up subroutines of the IDLSubs (Interface Definition Language Subroutines) or by dynamically creating the request by means of the function unit DII (Dynamic Invocation Interface). The second procedure allows a service to be requested which was not known at the time of the development of the CO object.

In the SO object, the receipt of the request is supported by functions in the DOA function unit (Basic Object Adapter). It is also possible for the object to offer an interface which corresponds to the two possibilities above, through the functions of the SKEL function unit.

It is also possible for the computer system to contain objects in addition to the CO and SO objects which are not specified in CORBA and which interact with each other and with the CO and SO objects over special interface units in the CORBA infrastructure described above. For a further explanation of the design example it is assumed that the CS computer system has such objects being differently implemented in the CORBA infrastructure.

The use of such hybrid components in a CORBA infrastructure has the advantage here that objects which already exist here and which are already specified according to another object model architecture can be reused and such objects can work together with CORBA objects. This has great advantages, in particular in the area of network management, as there are already many objects in this area which are specified according to OSI object models. OSI (Open Systems Interconnection) network management components, such as managers, agents and mediation devices, for example, are each formed from one or more such OSI objects.

For the area of network management, an object model is standardised by the OSI (Open System Interconnection) (Management framework for open systems interconnection, ITU-T recommendation X.700, 1992). In addition to the object model (SMI=Structure of Management Information), fundamental objects are also specified, as well as a set of management services (CMIS common management information service definition) and a network management protocol (CHIP=Common Management Information Protocol) for the objects to communicate with one another. Objects are specified in the description language GEMO which uses ASN (Abstract Syntax Notation) syntax and contains its own additional macros.

The principal difference between "natural" CORBA objects and "natural" OSI objects is that the CORBA objects represent the implementation of the CORBA interface whereas the OSI objects of a network management element are filed as data structure in the MIB data set (Management Information Base) and are manipulated through an agent with which communications are made by means of the CEMIP protocol.

In addition, naming and addressing in CORBA and OSI are different. In CORBA, an object has two addresses: a logical address, for example a name in a certain context, and a physical address (object reference) which states the physical location of the object, for example the address of the server on which the object is running. This address Is decisive for locating and interacting with a CORBA object. In OSI, an object has only one logical address (full distinguishing name) which results from its position in the objects' dependency tree. This address consists of the names of all objects from the root of the dependency tree to the object.

Figure 2:
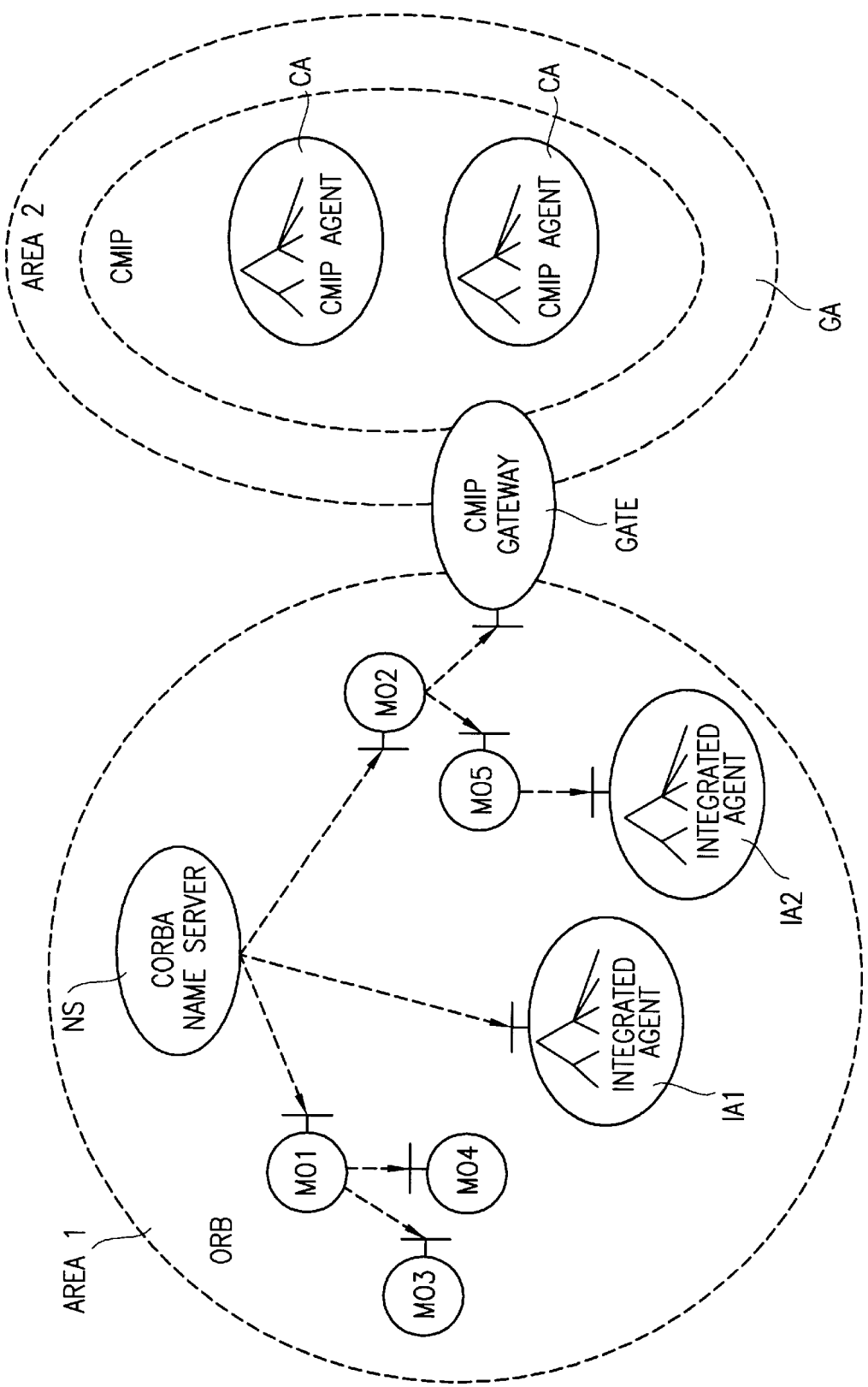
FIG. 2 shows a symbolic representation of dependency relationships between objects and the numbering areas resulting from this.

FIG. 2 shows a representation of the logical dependency between components in the computer system CS when non-CORBA specified objects are also implemented in the CORBA infrastructure on the CS computer system.

FIG. 2 shows two areas AREA1 and AREA2, a service NS and several components M01 to M05, IA1, IA2 and GA (Gateway Area), between which a logical dependency relationship is defined.

In the area AREA1, the interaction of objects occurs by means of CORBA mechanisms based on a CORBA infrastructure. In the area AREA2, the interaction of objects occurs by means of the CEMIP (Configuration Efficient Management Internet Protocol) protocol.

Each of the components M01 to M05, IA1, IA2 and GA contains one or more objects and is responsible for the naming management of the components which immediately follow it. The root of the dependency tree so defined forms the NS service. This is responsible for the naming management of components M01, IA1 and M02. This means that the name of the components M01, IA1 and M02 is contained in its naming context. The component M01 is responsible for the naming management of components M02 and M04. The component M02 is responsible for the naming management of components M05 and GA. The component M05 is responsible for the naming management of component IA2.

The components M01 to M05 are "natural" CORBA objects as described in FIG. 1a and FIG. 1b. A CORBA object is thus allocated to this component. The dependency relationship between these components follows the dependency relationship between the objects. A CORBA server can also include several CORD objects.

With both the IA1 and TA2 components, there are one or more objects which are specified in CORBA and which by means of a special interface unit are encapsulated so that they can act over CORBA mechanisms over the CORBA infrastructure. Each of these components thus forms an independent naming area which is internally managed.

Figure 3A:
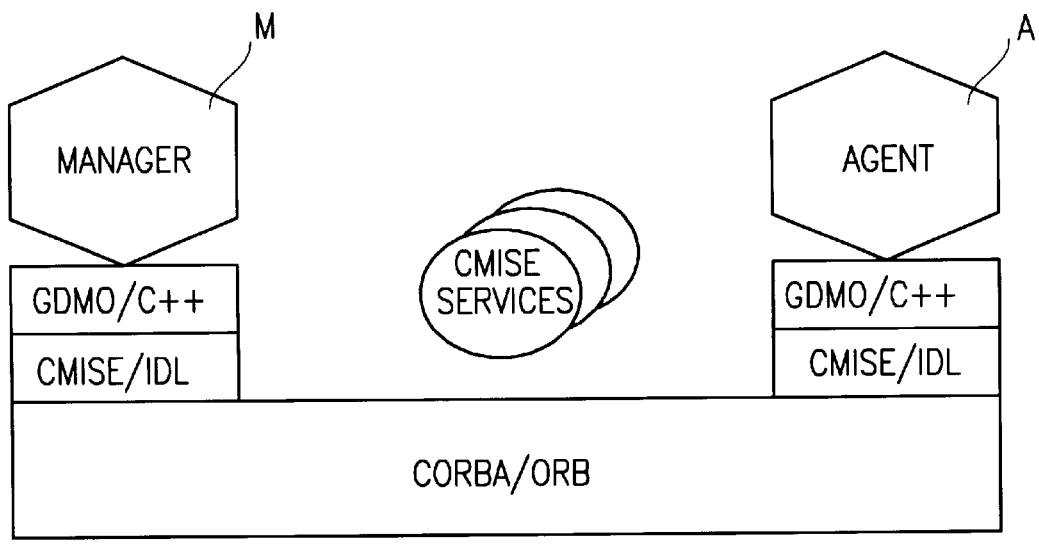
FIG. 3a shows a functional representation of the first possible way of connecting objects not specified in CORBA.
Figure 3B:
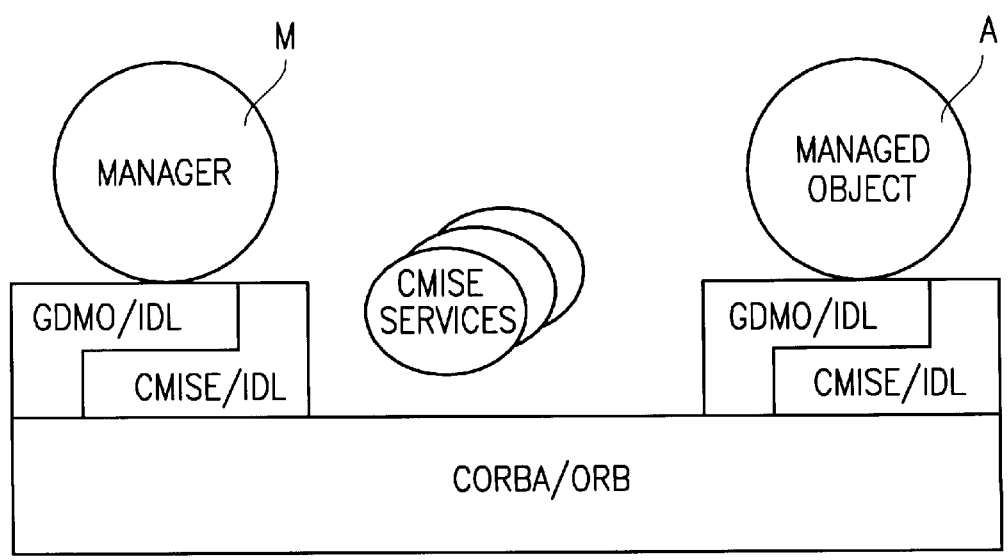
FIG. 3b shows a functional representation of the second possible way of connecting objects not specified in CORBA.

Examples of the production of such components can be seen in FIG. 3a and FIG. 3b.

FIG. 3a and FIG. 3b show a representation of the communication mechanisms for communications between two components IA1 and IA2 over the CORBA infrastructure. The components IA1 and IA2 are indicated in the description of FIG. 3a and FIG. 3b using M and A.

Figure 4A:
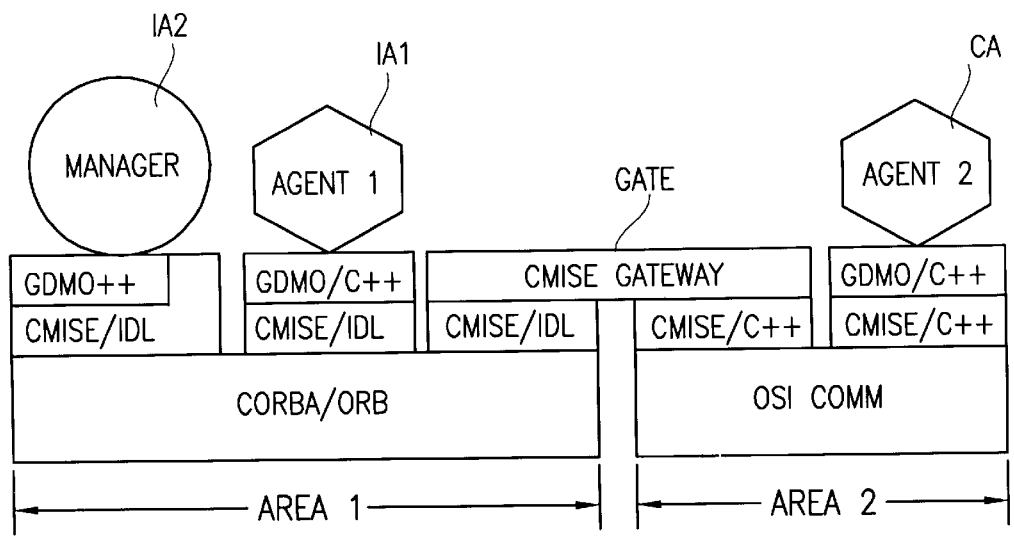
FIG. 4a shows a functional representation of the third possible way of connecting objects not specified in CORBA.

FIG. 4a shows a communication layer CORBA/ORB, several CMISE (Common Management Information Service Element) services generally available over this communication layer, two network management components M and A and two communication functions GMO/C++ and CMISE/IDL between these objects and the communication layer CORBA/ORB.

In the components M and A we are not dealing with CORBA objects but one or more OSI objects OM or OA and a manager or agent function unit. By means of the agent or manager function units, operations are executed on these objects or requests are sent to other objects. Agent and manager function units communicate over the CMIP protocol. From the point of view of the network management, the component M takes on the rile of manager and the component A that of agent.

The communication unit GDMO/C++ (Guidelines for Definition of Managed Objects in C++) consists of one or more special access objects which facilitate he execution of CMISE operations on object OA or OM.

The CHISE management services are realised by a CMISE object on the part of the OA object. The interface unit-CMISE/IDL contains this CMISE object and the services allocated to this object. The CMISE object of the interface unit CMISE/IDL is specified by an IDL interface and acts and gives the external impression of a CORBA object. In order to facilitate this specification and thus the providing of a CORBA interface to the object OA, a type conversion of ASN.1 (Abstract Syntax Notation.1) into IDL types is required. CMISE services thus make a set of CORBA objects available. Through CORBA requests routed over the CORBA infrastructure, CMISE operations can thus be executed on the object OA. The same applies for the object MO.

A second possible way of connecting OSI objects over a CORBA infrastructure is shown in FIG. 3b.

FIG. 3b shows a communication layer CORB/ORB, several CMISE services generally available over this communication layer, the objects OM and OA and two communication functions GDMO/IDL and CMISE/IDL between these objects and the communication layer CORB/ORB.

Through the interface unit GDMO/IDL, the OSI objects of components A and M specified in GDMO are translated into a specification as an IDL interface. An object specified in such a way can be accessed through classic CORBA messages. Each of these OSI objects is thus transformed into a pure CORBA object. As the specifications in IDL and ASN.1 have different natures (interface description<—>object specification), a complete translation is not possible and only a subset of CMISE operations can be executed on the transformed CORBA objects.

The objects in components IA1 and IA2 have a dependency relationship which is represented by the data structure in the MIB data set. Each of the components IA1 and IA2 have a name which is registered as a naming context in the preceding components and is managed by them. This naming context thus represents the root of the internal dependency tree for components IA1 and IA2. One could also say that this context represents the root of the naming area of components IA1 or IA2. The agent of components IA1 and IA2 independently manages the naming of the component dependent on the root of the internal dependency tree; the naming management of MIB is regulated independently like this. In addition, due to the recursive nature, this naming management also forms a part unit of the CORBA naming management and also interacts with the other parts of the CORBA naming management.

In the GA component we are dealing with several network management elements (CMIP agents) which interact over the CHIP protocol and which are connected with the CORBA infrastructure by means of a gateway GATE. These network elements together form an independent naming area which is connected over the GATE gateway.

Figure 4B:
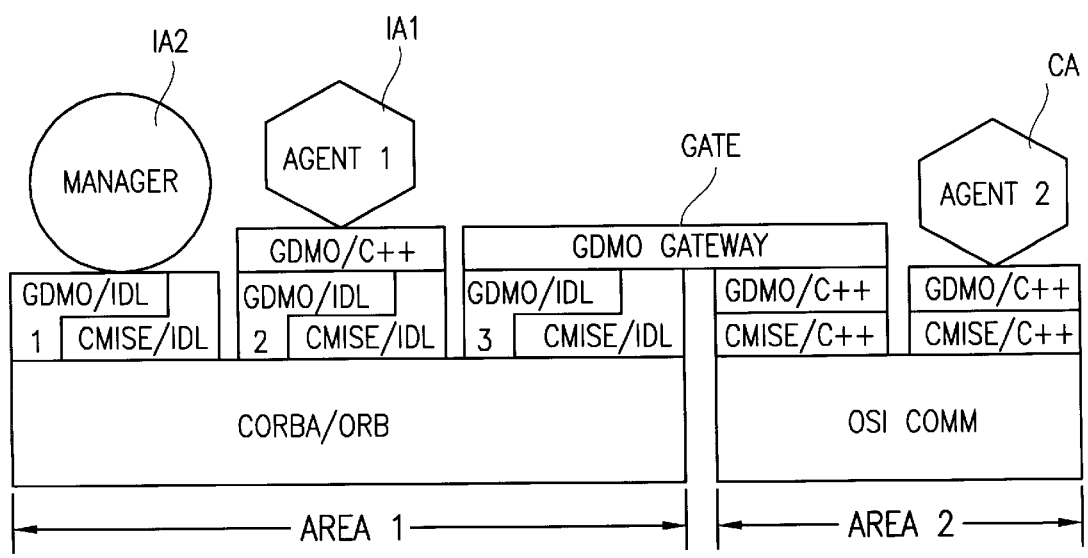
FIG. 4b shows a functional representation of a fourth possible way of connecting objects not specified in CORBA.

In FIGS. 4a and 4b, possible ways of interacting such network management components over the GATE gateway are shown. The exact method of function can be seen in the representations in FIGS. 4a and 4b together with the description of the corresponding units which has already been made in the description of FIGS. 3a and 3b.

The interface to the GA component forms the GATE gateway. The naming of the GA component is managed by the component M02. There are as many naming contexts for the GA component contained in this as there are roots of internal dependency trees in the AREA2 area. Normally, each CA network element contains a MIB (Management Information Base) data set with a dependency tree which has one root. Thus in the naming management of component M02 two naming contexts are stored and managed for the component GA, for example, which each represent the root of an OSI dependency tree. One could also say that this naming context represents the root within the independent naming area of the component GA.

Further naming management within the area AREA2 is executed by means of the naming management designed within the OSI architecture.

In addition, this naming management also forms a part unit of the CORBA naming management due to its recursive nature and thus also interacts with the other parts of the CORBA naming management.

The parts of this CORBA naming management each offer an access interface which corresponds to the access interface of the CORBA naming service. Thus a uniform access to all parts of the naming management is possible. If the translation of a logical address into a physical CORBA address is now requested by such a part of the naming management, then this part of the naming management will interact according to a recursive algorithm with the other parts of the naming management. This recursive algorithm involves going from one part of the naming management to the next part of the naming management, according to the logical address in the components' dependency tree, until the part of the naming management is reached in which the logical address of the object sought is stored. This can be the allocated part of the naming management which is responsible for the naming of the component which is allocated to this object if we are dealing with a CORBA object in the component. It can also be a case of the internal naming management of the component to which the object is allocated if, for example, we are dealing with a component of the component type IA1, IA2 or GA.

What is claimed is:

1. A process of managing naming of objects in an object environment in which a plurality of objects interact using CORBA (Common Object Request Broker Architecture) mechanisms, comprising the steps of:

arranging, in a dependency tree structure, a root, a plurality of objects, and a plurality of components including a first type of component containing CORBA object(s) and a second type of component containing object(s) not specified in CORBA, and where each component includes at least one respective object;

providing a plurality of partial naming managers, each assigned to one of said components; and using each partial naming manager, managing naming of respective objects located in said dependency tree structure in a direction, from said partial naming manager, away from said root, said objects not specified in CORBA collectively forming an independent naming area.

2. A process as in claim 1, wherein each component performs said managing of naming step by utilizing a CORBA interface which is uniform for all components.

3. A process as in claim 1, further comprising the step of using a recursive algorithm in said step of managing the naming of said objects by said partial naming managers.

4. A process as in claim 1, characterised by a central CORBA service forming the root of the dependency tree formed by the components.

5. A process as in claim 1, wherein a logical root of the independent naming area centrally performs naming management for components within said area.

6. A process as in claim 1, further comprising providing an OSI (Open Systems Interconnection) network management element as a first subtype of the second type of component and setting a CORBA interface thereon.

7. A process as in claim 1, further comprising using OSI (Open Systems Interconnection) network management elements, which are accessed through a gateway, as a second subtype of the second type of component.

8. A process for mapping a logical address of an object onto a physical address of an object in an object environment, in which a plurality of objects are arranged in a dependency tree extending from a root, and interact over CORBA mechanisms, in which process the mapping is produced by a naming management, wherein the mapping is produced by a plurality of partial naming managements working together, which for any component manages the naming of a component or components which immediately follow that component in terms of remoteness from said root, said dependency tree includes a plurality of objects specified in CORBA in a first naming area (AREA1) and a further plurality of objects not specified in CORBA in a second naming area (AREA2), mapping of objects in said first and second naming areas being performed by different respective partial naming managers, and in which such components include one or more objects among the plurality of objects.

9. A program module for use in a computer system having a dependency tree extending from a root, comprising a CORBA (Common Object Request Broker Architecture) interface for interaction of CORBA objects over CORBA mechanisms and a set of first functions for providing application services, wherein the program module contains a plurality of second functions which are arranged in such a way that said second functions perform naming management of objects which immediately follow said program module in the dependency tree in remoteness from said root, said objects including both CORBA objects and objects not specified in CORBA.

10. A computer system having a dependency tree extending from a root, comprising means for generating a CORBA (Common Object Request Broker Architecture) interface for interaction of CORBA objects over CORBA mechanisms, the interface having a set of first functions for providing application services, and means for generating a plurality of second functions which are arranged so that the second functions perform naming management of objects which immediately follow the second functions in the dependency tree, in remoteness from said root, said objects including both CORBA objects and objects not specified in CORBA.

11. A computer system with a root and a number of objects which interact via CORBA mechanisms and with a naming management for said number of objects, wherein each of said objects is associated with a component, naming management is performed by respective ones of said components and wherein each component manages the naming of the component or object which immediately follows it, in terms of remoteness from said root.

12. A computer system as in claim 11, wherein the computer system is a network management system.

* * * * *